US010516321B2

(12) United States Patent
Kobayashi

(10) Patent No.: US 10,516,321 B2
(45) Date of Patent: Dec. 24, 2019

(54) AC POWER GENERATOR

(71) Applicant: Mitsubishi Electric Corporation, Tokyo (JP)

(72) Inventor: Yuzuru Kobayashi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/760,714

(22) PCT Filed: Nov. 10, 2015

(86) PCT No.: PCT/JP2015/081557
§ 371 (c)(1),
(2) Date: Mar. 16, 2018

(87) PCT Pub. No.: WO2017/081738
PCT Pub. Date: May 18, 2017

(65) Prior Publication Data
US 2018/0269750 A1    Sep. 20, 2018

(51) Int. Cl.
*H02K 9/28*    (2006.01)
*H02K 19/36*   (2006.01)
*H02K 9/22*    (2006.01)
*H02K 11/04*   (2016.01)
*H02K 11/33*   (2016.01)

(52) U.S. Cl.
CPC .............. *H02K 9/28* (2013.01); *H02K 9/22* (2013.01); *H02K 11/046* (2013.01); *H02K 11/33* (2016.01); *H02K 19/365* (2013.01); *H02K 2203/03* (2013.01)

(58) Field of Classification Search
CPC ...... H02K 19/365; H02K 9/28; H02K 11/046; H02K 11/33; H02K 19/36; H02K 2203/03; H02K 9/22
USPC ............................................................ 310/64
See application file for complete search history.

(56) References Cited

U.S. PATENT DOCUMENTS 7,605,502 B2 * 10/2009 Kondo ................. H01L 25/115
                                                    310/58
2006/0125240 A1 *  6/2006 Kato .................... F02N 11/04
                                                    290/31
(Continued)

FOREIGN PATENT DOCUMENTS

JP      1-107174 U    7/1989
JP      5-154589 A    6/1993
(Continued)

OTHER PUBLICATIONS

International Search Report of PCT/JP2015/081557 dated Feb. 2, 2016.
(Continued)

*Primary Examiner* — Alex W Mok
(74) *Attorney, Agent, or Firm* — Sughrue Mion, PLLC; Richard C. Turner

(57) ABSTRACT

This invention is concerning a rectifying device in an AC power generator, the rectifying device including a broken-ring-shaped heat sink supporting a rectifying element and cooling the rectifying element and a circuit board holding the heat sink. The circuit board includes an engaging projection. The heat sink includes a hole, into which the engaging projection is fit, and a gravity center adjustment portion.

3 Claims, 7 Drawing Sheets

(56) References Cited

U.S. PATENT DOCUMENTS

| | | | |
|---|---|---|---|
| 2006/0138979 A1* | 6/2006 | Kuribayashi | H02K 11/048 318/139 |
| 2007/0057584 A1 | 3/2007 | Takahashi et al. | |
| 2008/0265700 A1* | 10/2008 | Bradfield | H01L 25/115 310/64 |
| 2008/0316786 A1* | 12/2008 | Murakami | H02K 11/046 363/141 |
| 2009/0058211 A1* | 3/2009 | Oowatari | H02K 3/02 310/179 |
| 2012/0126638 A1 | 5/2012 | Tanaka | |
| 2014/0339931 A1 | 11/2014 | Tanaka et al. | |

FOREIGN PATENT DOCUMENTS

| | | |
|---|---|---|
| JP | 2001-63729 A | 3/2001 |
| JP | 4620566 B2 | 1/2011 |
| JP | 2011-250495 A | 12/2011 |
| JP | 2012-110180 A | 6/2012 |
| WO | 2013/132653 A1 | 9/2013 |

OTHER PUBLICATIONS

Communication dated Dec. 18, 2018 issued by the Japanese Patent Office in counterpart application No. 2017-549891.
Communication dated Feb. 26, 2019, from the European Patent Office in counterpart European Application No. 15908262.7.

* cited by examiner

AC POWER GENERATOR

CROSS REFERENCE TO RELATED APPLICATIONS

This is a National Stage of International Application No. PCT/JP2015/081,557 filed Nov. 10, 2015.

TECHNICAL FIELD

This invention relates to an AC power generator including a rectifying device supported on a casing, and particularly to improvement in the rectifying device.

BACKGROUND ART

A rectifying device for a vehicular AC power generator includes an arc-shaped positive-side heat sink having a heat dissipation fin and supporting a positive-side diode as a rectifying element, and an arc-shaped negative-side heat sink having a heat dissipation fin and supporting a negative-side diode as a rectifying element. The rectifying device also includes a circuit board electrically connecting the positive-side diode and the negative-side diode to the tip portion of winding of a stator coil. At two spaced-apart positions inside the periphery of the arc-shaped circuit board, engaging projections are provided. These engaging projections are press-fit into respective corresponding holes of the positive-side heat sink and the negative-side heat sink and screwed to a rear bracket, while holding the positive-side heat sink and the negative-side heat sink. At substantially middle portions between three fixation holes, the engaging projections and the holes are respectively disposed for co-fastening and fixing the assembled rectifying device to a case such as the rear bracket. This suppresses vibration transmitted from a vehicle or the sympathetic vibration of the rectifying device resulting from the vibration of the AC power generator and reduces a mechanical load on each component (see, e.g., PTL 1).

PTL 2 discloses a rectifying device having a configuration including fitting projecting portions and holding holes. In this rectifying device, a positive-side heat sink (FIGS. 1 and 4 in PTL 2) including a wall portion extending long in an axial direction inside the periphery thereof and a plate-like negative-side heat sink including no heat dissipation fin are shown.

Meanwhile, there is a lead that is fixed to the bonding region of the surface of a semiconductor element via a bonding material and that has a gravity-center adjustment portion provided in the end portion of the lead located over the semiconductor element. Due to the effect of preventing the weight of the lead from generating a rotation moment, the lead can be fixed to the surface of the semiconductor element in a statically self-supported and non-inclined state even when the lead is not fixed. As a result, the lead need not be fixed using a spacer or a weight in a bonding step, thereby inducing the effect of improving the productivity and yield of a semiconductor device (see, e.g., PTL 3).

CITATION LIST

Patent Literature

[PTL 1] Japanese Patent Application Publication No. 2011-250495
[PTL 2] Japanese Patent Application Publication No. 2012-110180
[PTL 3] Japanese Patent No. 4620566 (Specification)

SUMMARY OF INVENTION

Technical Problem

In a conventional rectifying device, particularly a plate-like heat sink not provided with heat dissipation fin, the periphery of the holding portion projects partly from the surface of the heat sink.

(FIGS. 4 and 7 and reference numerals 23 and 27 in PTL 2). In the heat sink having this configuration, when the prepared heat sinks are stored in a stacked fashion in a step before rectifying elements are press-fit into a plurality of respective fitting holes for the rectifying elements, the heat sinks cannot be neatly stacked in a space-saving manner, which leads to a problem when the heat sinks are supplied. In addition, in terms of workability in press-fitting the rectifying elements, in each of the heat sinks formed into a plate-like shape, two portions each located inside the periphery and configured to extend long in a substantially C-shape when viewed in the axial direction are formed with stepped portions. As a result, when the plurality of heat sinks are stacked, the stepped portions interfere with each other to incline the heat sinks and consequently the heat sinks may not be able to be correctly stacked.

This invention has been created in view of the foregoing, and an object thereof is to obtain an AC power generator which allows individual heat sinks to be efficiently stacked and smoothly supplied to a production line in an assembly step and allows productivity thereof to be improved.

Solution to Problem

To attain the object described above, an AC power generator of this invention includes a rotor rotatably supported in a casing, a stator having a stator winding wire and supported on the casing, a rectifying device disposed outside one end of the casing in an axial direction to rectify an AC current generated in the stator winding wire, and a voltage adjuster disposed outside the one end of the casing in the axial direction to adjust a magnitude of the AC voltage generated in the stator. The rectifying device includes a broken-ring-shaped heat sink supporting a rectifying element and cooling the rectifying element and a circuit board holding the heat sink. The circuit board includes an engaging projection. The heat sink includes a hole into which the engaging projection is fit and a gravity center adjustment portion.

Advantageous Effects of Invention

According to this invention, it is possible to efficiently stack heat sinks by preventing the heat sinks from being inclined with respect to each other, smoothly supply the individual heat sinks to a production line in an assembly step, and improve productivity thereof.

DESCRIPTION OF EMBODIMENTS

Figure 1:
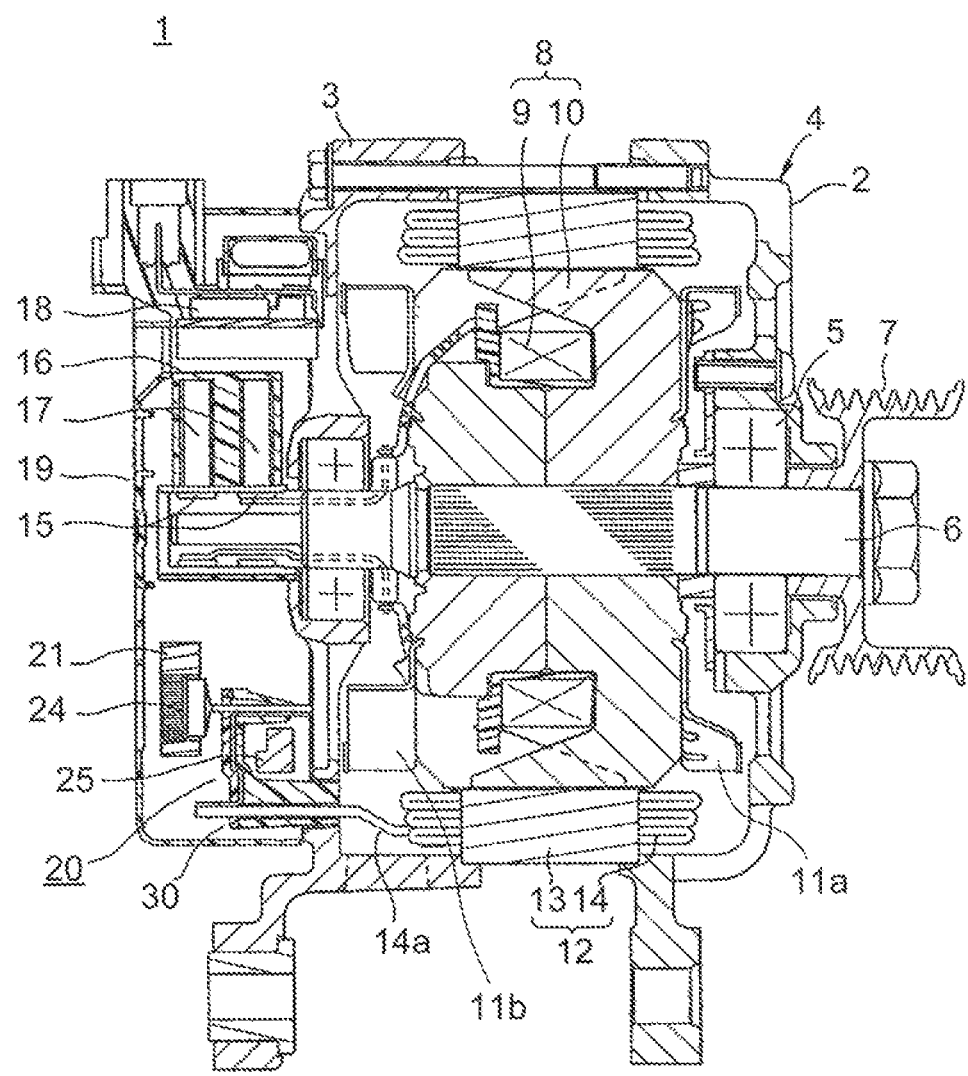
FIG. 1 is a vertical cross-sectional view showing an AC power generator according to Embodiment 1 of this invention.

The following will describe embodiments of this invention on the basis of the accompanying drawings. Note that, in the drawings, like reference numerals are assumed to designate like or corresponding parts.

Embodiment 1

FIG. 1 is a cross-sectional view of a vehicular AC power generator as an AC power generator according to Embodiment 1 of this invention.

A vehicular AC power generator 1 includes a casing 4, a shaft 6, a pulley 7, a rotor 8, fans 11a and 11b, and a stator 12. The casing 4 includes a front bracket 2 and a rear bracket 3 each made of aluminum and having a substantially bowl shape. The shaft 6 is rotatably supported on the casing 4 via a pair of bearings 5. The pulley 7 is fixedly attached to an end portion of the shaft 6 extending toward the front side of the casing 4. The rotor 8 is fixed to the shaft 6 and disposed in the casing 4. The fans 11a and 11b are fixed to the both end surfaces of the rotor 8 respectively in an axial direction. The stator 12 is fixed to the casing 4 so as to completely surround the rotor 8.

The vehicular AC power generator 1 further includes, in addition to the above, a pair of slip rings 15, a rectifying device 20, a pair of brushes 17, a voltage adjuster 18, and a protective cover 19. The pair of slip rings 15 are fixed to the extending portion of the shaft 6 extending toward the rear side of the casing 4 to supply a current to the rotor 8. The rectifying device 20 is produced in a substantially C-shape and disposed in a fan shape around the shaft 6 on a plane orthogonal to the shaft core of the shaft 6 outside the peripheries of the slip rings 15 to rectify an AC voltage generated in the stator 12. The pair of brushes 17 are contained in a brush holder 16 located outside the peripheries of the pair of slip rings 15 and disposed between the tips of the substantially C-shape of the rectifying device 20 to slide relative to each of the slip rings 15. The voltage adjuster 18 is attached to the brush holder 16 to adjust the magnitude of the AC voltage generated in the stator 12. In the vehicular AC power generator 1, a connector is provided, though the illustration thereof is omitted. The connector is disposed on the rear side of the rear bracket 3 to perform signal input/output between the voltage adjuster 18 and an external device not shown. The protective cover 19 is made of an insulating resin attached to the rear bracket 3 so as to cover the rectifying device 20, the brush holder 16, and the voltage adjuster 18.

The rotor 8 includes a field winding wire 9 which allows an excitation current to flow therein to generate a magnetic flux and a pole core 10 which is provided so as to cover the field winding wire 9 and in which the magnetic flux forms a magnetic pole. On the other hand, the stator 12 includes a cylindrical stator iron core 13 and a stator winding wire 14 which is wound around the stator iron core 13 and in which a change in the magnetic flux from the field winding wire 9 causes an AC current as the rotor 8 rotates. The stator iron core 13 is disposed so as to be held between the front and rear brackets 2 and 3, located on both sides thereof in the axial direction, and surround the rotor 8. Note that, by way of example, the rotor 8 is assumed to have 12 poles and the number of slots formed in the stator iron core 13 is assumed to be 72. That is, two slots are formed per pole per phase. The stator winding wire 14 includes two pairs of Y-connected 3-phase AC winding wires.

Figure 2:
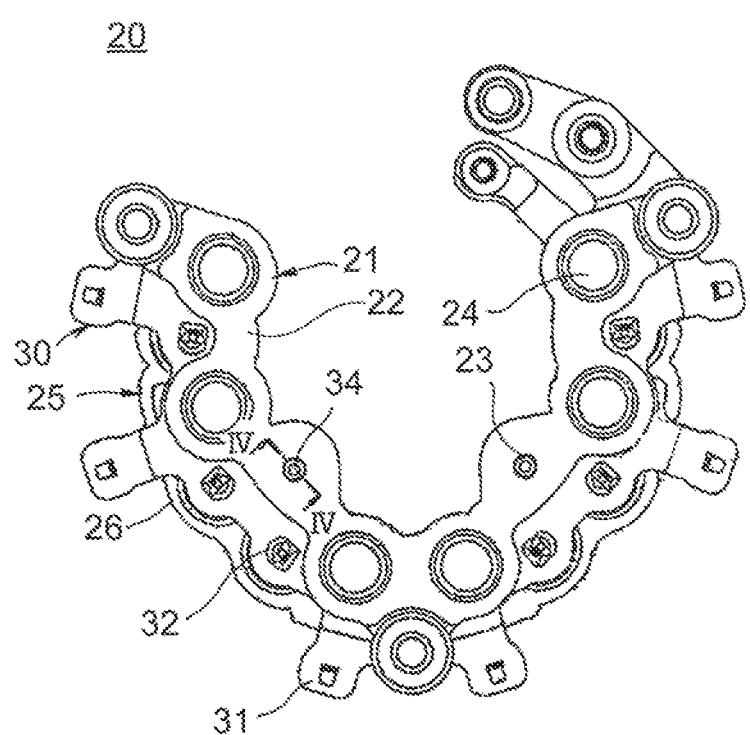
FIG. 2 is a front view showing a rectifying device in FIG. 1.
Figure 3:
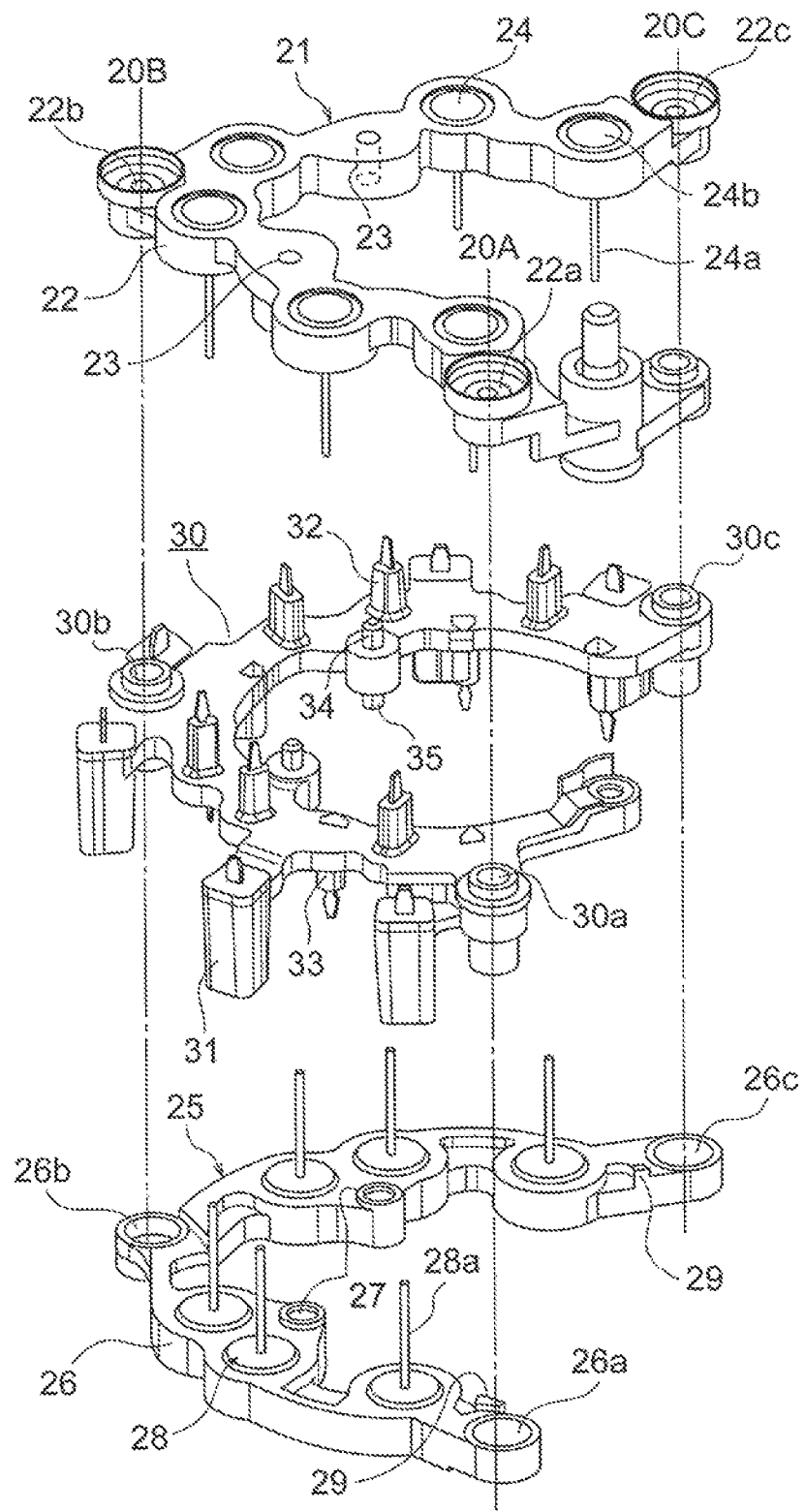
FIG. 3 is an exploded perspective view showing the rectifying device in FIG. 1.
Figure 4:
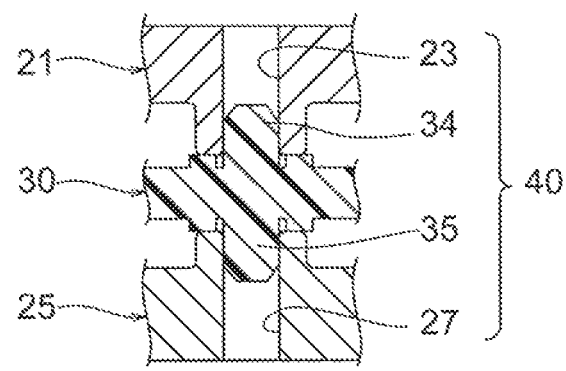
FIG. 4 is an arrow cross-sectional view along the line IV-IV in FIG. 2.

Next, a configuration of the rectifying device 20 will be described with reference to FIGS. 2 to 4. The rectifying device 20 includes a positive-side heat sink ASSY 21 as a first heat sink ASSY on which six positive-side rectifying elements 24 are mounted, a negative-side heat sink ASSY 25 as a second heat sink ASSY on which six negative-side rectifying elements 28 are mounted, and a circuit board 30 which connects the positive-side rectifying elements 24 and the negative-side rectifying elements 28 so as to form a bridge circuit.

Each of the positive-side heat sink 22 and the negative-side heat sink 26 forming the respective heat sinks ASSY is produced by using, for example, aluminum to have a plate shape having a thickness basically including the thickness of each of the positive-side rectifying elements 24 or the negative-side rectifying elements 28 which are press-fit therein. Each of the positive-side heat sink 22 and the negative-side heat sink 26 has a partly broken ring shape or a shape which can be regarded as a substantially C-shape or U-shape. The circuit board 30 is produced by mold-forming a plurality of insert terminals not shown using an insulating resin or the like.

The axial direction of the rectifying device 20 corresponds to the thickness direction of each of the plate-like heat sinks, i.e., the direction in which the positive-side heat sink ASSY 21, the circuit board 30, and the negative-side heat sink ASSY 25 are stacked. The rectifying device 20 is disposed, with the negative-side heat sink ASSY 25 facing the end surface of the rear bracket 3 and disposed in the generally C-shape outside the peripheries of the slip rings 15. The rectifying device 20 is fixed to the rear bracket 3 by screwing, to the rear bracket 3, fixation bolts, not shown, which are inserted through casing co-fastening fixation portions 20A, 20B, and 20C from the positive-side heat sink ASSY 21 via insulating members not shown. As a result, the rectifying device 20 is disposed such that the positive-side heat sink 22 is located at the rearmost position. The rectifying device 20 is disposed in the substantially C-shape around the shaft 6. The surface of the positive-side heat sink 22 of the rectifying device 20 is located on a plane orthogonal to the shaft core of the shaft 6. Lead wires 14a (FIG. 1) of the two pairs of 3-phase AC winding wires included in the stator winding wires 14 are led out from the rear bracket 3 toward the rear side and respectively inserted into stator winding wire connectors 31 and welded to the other ends of insert conductors not shown. The positive-side rectifying elements 24 and the negative-side rectifying elements 28 are connected to the respective insert conductors, which are not shown, by a positive-side rectifying element connector 32 and a negative-side rectifying element connector 33 of the circuit board 30 to form the bridge circuit. Into a through hole in one end portion of the positive-side heat sink ASSY 21 in a circumferential direction, an output terminal bolt (not shown) serving as an output terminal is inserted.

A holding portion 40 includes engaging projections provided on the circuit board 30 and holes provided in the heat sink facing the engaging projections in the axial direction. The engaging projections are provided inside the periphery of the arc-shaped circuit board 30 and between the casing co-fastening fixation portions 20A and 20B and between the casing co-fastening fixation portions 20B and 20C. As shown in the cross-sectional view of FIG. 4, an engaging projection 34 provided to face the back surface of the positive-side heat sink 22 (lower side on the page of FIG. 4) and an engaging projection 35 provided to face the top surface of the negative-side heat sink 26 (upper side on the page of FIG. 4) are configured in back-to-back relation. The engaging projections 34 and 35 are screwed to the rear bracket 3, while being press-fit in corresponding holes 23 and 27 of the positive- and negative-side heat sinks 22 and 26 and held thereon. By disposing the engaging projections and the holes at substantially middle portions between the three fixation holes for effecting co-fastening fixation, vibration transmitted from a vehicle or the sympathetic vibration of the rectifying device resulting from the vibration of the AC power generator is suppressed to reduce a mechanical load on each component.

Each of the circuit board 30 and the two heat sinks is configured to have a minimum axial length that satisfies a required strength, a required rectifying element holding function, or the like. In the holding portion 40, the respective surfaces of the circuit board 30 and the two heat sinks which face each other have stepped shapes, and depressions and projections resulting from the steps abut on each other. The top surface of the positive-side heat sink 22 and the back surface of the negative-side heat sink 26 which do not face the circuit board 30 are basically configured to be planar.

Figure 5:
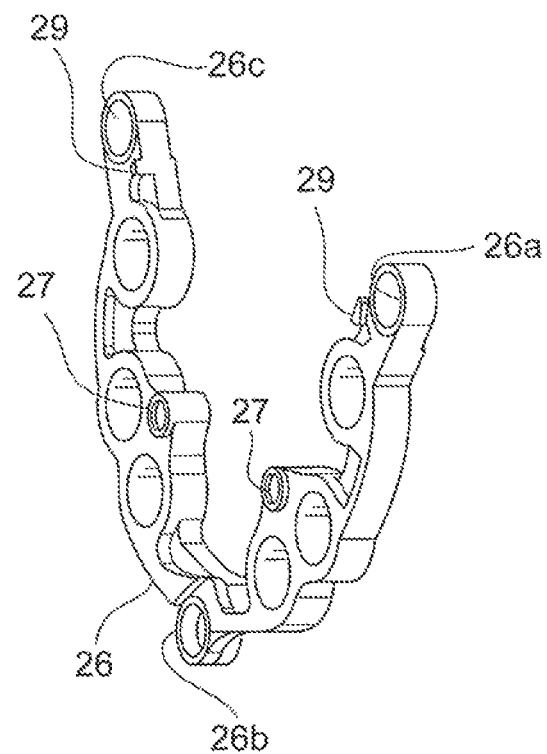
FIG. 5 is a perspective view of a negative-side heat sink according to Embodiment 1 of this invention.
Figure 6:
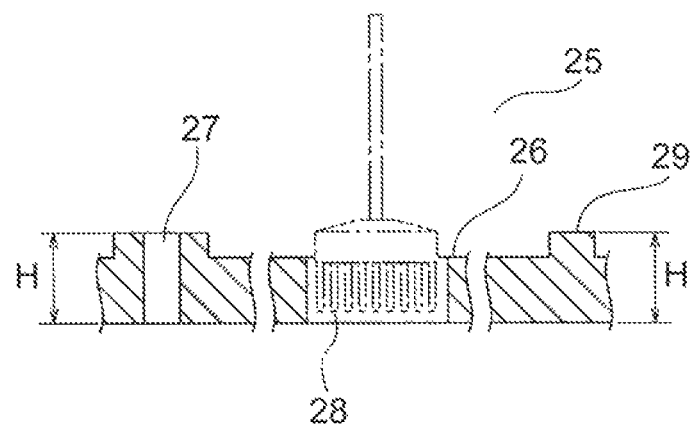
FIG. 6 is a main-portion cross-sectional view of FIG. 5.
Figure 7:
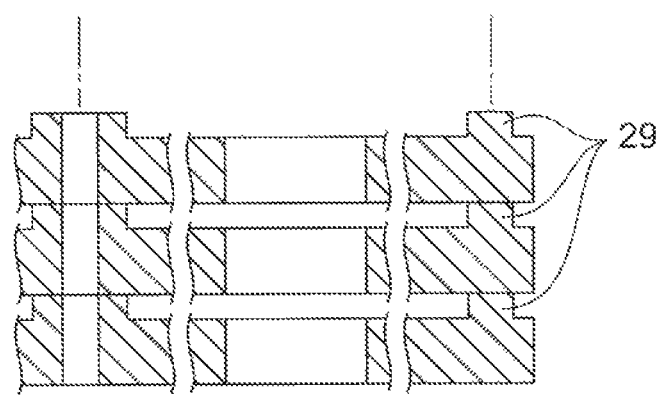
FIG. 7 is a view showing a stacked state.

On the surface of the negative-side heat sink 26 which faces the circuit board, gravity center adjustment portions 29 each formed of the same level difference as that of the step around the hole 27 are provided (FIG. 5). That is, as shown in the cross-sectional views of FIGS. 6 and 7, the thickness of the portion with the hole 27 and the thickness of each of the gravity center adjustment portions 29 are equalized. The steps around the two holes 27 that are provided inside the periphery of the substantially C-shape inhibit the inclination of another heat sink, which has inevitably occurred when a plurality of the negative-side heat sinks 26 are stacked. The gravity center adjustment portions 29 are provided herein at respective positions around the both tip portions of the substantially C-shape. However, the gravity center adjustment portion 29 may also be provided at either one of the positions or at another position as long as the other stacked heat sink can keep balance.

In the vehicular AC power generator 1, an output terminal bolt not shown is attached to the positive-side heat sink ASSY 21 and electrically connected to the cathode of each of the positive-side rectifying elements 24 via the positive-side heat sink 22 to form the output terminal of the rectifying device 20. The output terminal of the rectifying device 20 forms the output terminal of the vehicular AC power generator 1. On the other hand, the anode of each of the negative-side rectifying elements 28 is grounded via the negative-side heat sink 26 and the rear bracket 3. Also, the lead wires 14a of the stator winding wires 14 are connected to the other ends of the insert conductors not shown in the stator winding wire connectors 31 and connected to respective connection points between the positive-side rectifying elements 24 and the negative-side rectifying elements 28 of the 3-phase rectifying element bridge. Also, the field winding wire 9 is connected to the voltage adjuster 18 via the slip rings 15 and the brushes 17.

Next, a description will be given of the operation of the vehicular AC power generator 1 thus configured. First, a current is supplied to the field winding wire 9 of the rotor 8 via the brushes 17 and the slip rings 15 to generate a magnetic flux. The magnetic flux alternately forms N-poles and S-poles in the circumferential direction in the portion outside the periphery of the pole core 10. On the other hand, a rotary torque from an engine (not shown) is transmitted to the shaft 6 via a belt (not shown) and the pulley 7 to rotate the rotor 8. Then, a rotating magnetic field is given to the stator winding wires 14 of the stator 12 to generate an electromotive force in the stator winding wire 14. This AC electromotive force is rectified by the rectifying device 20 and supplied to a vehicle-mounted load and a battery. As a result, the vehicle-mounted load is driven and the battery is charged.

Embodiment 2

Next, a description will be given of Embodiment 2 of this invention with reference to FIGS. 8 and 9. Note that Embodiment 2 is assumed to be the same as Embodiment 1 described above except for the portion described below.

In Embodiment 1 described above, the positive- and negative-side heat sinks 22 and 26 include no fin. However, in this embodiment, the positive- and negative-side heat sinks 22 and 26 include fins each having the same thickness as the thickness of each of the heat sinks.

Figure 8:
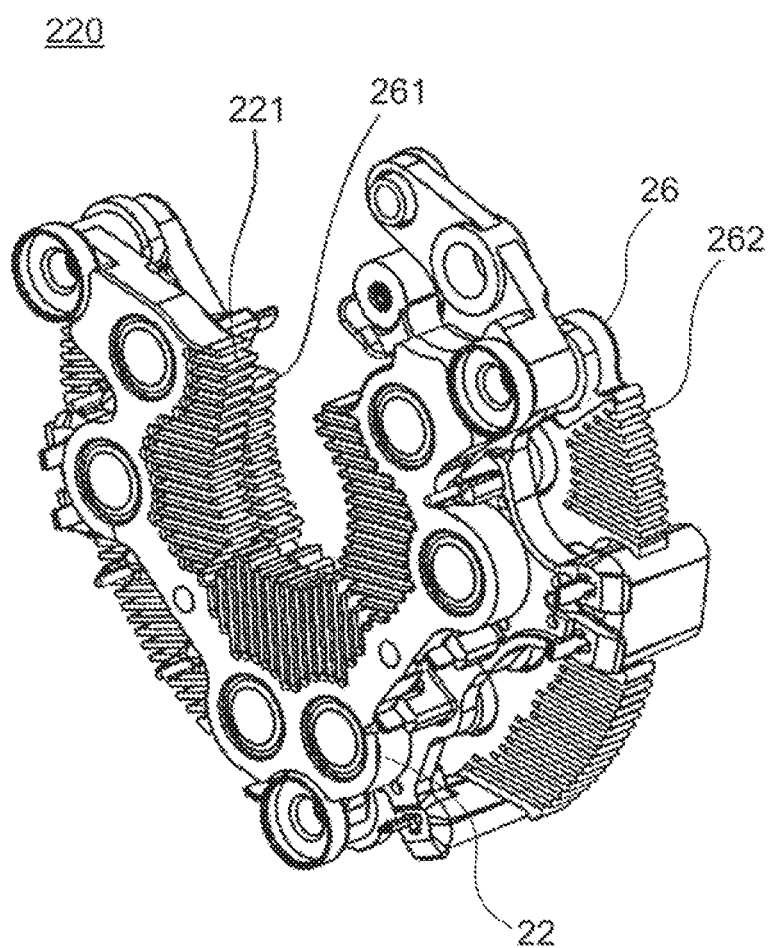
FIG. 8 is a perspective view showing a rectifying device in an AC power generator according to Embodiment 2 of this invention.

In the example shown in the perspective view of FIG. 8, in a rectifying device 220, a positive-side fin 221 extends toward the inside of the periphery of the positive-side heat sink 22, while negative-side fins 261 and 262 extend respectively toward the inside and outside of the periphery of the negative-side heat sink 26. The configuration is otherwise the same as that in Embodiment 1.

Figure 9:
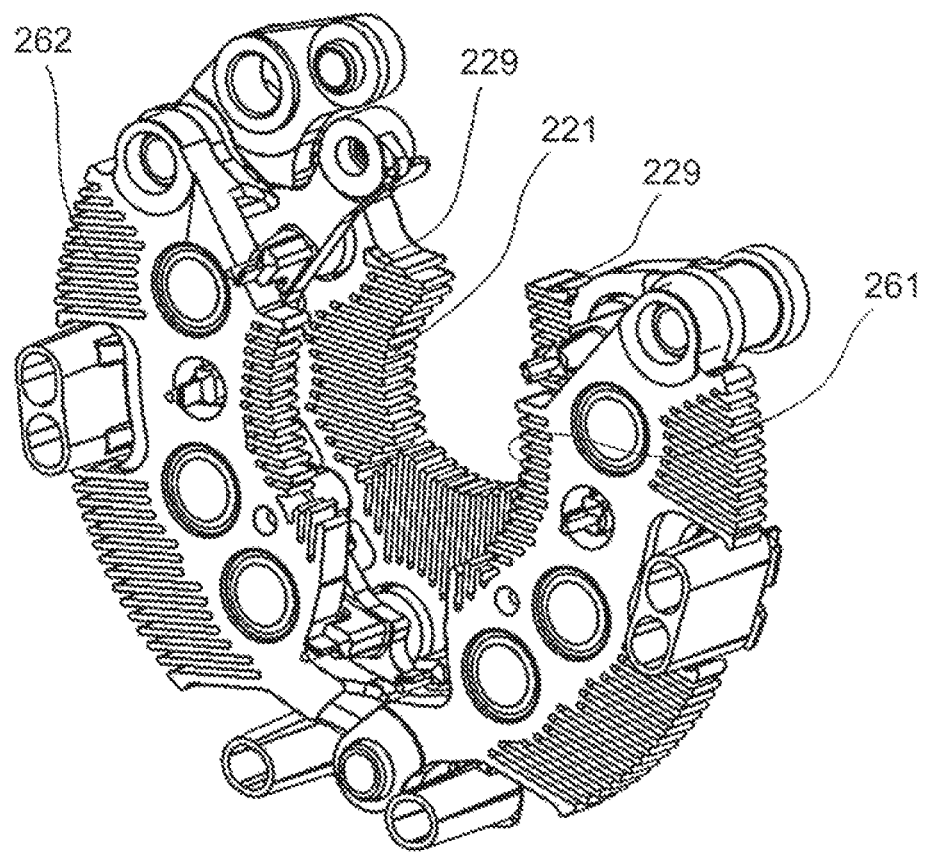
FIG. 9 is a rear perspective view of FIG. 8.

For example, in the case of the positive-side heat sink 22 provided with the positive-side fin 221 in FIG. 9, gravity center adjustment portions 229 each configured to be stacked in the form of a fin do not interrupt the air flow between the fins and do not degrade the cooling performance of the power generator.

As described above, according to this invention, in the heat sink of the rectifying device, the gravity center adjustment portions are formed. Accordingly, when the plurality of heat sinks each having a substantially C-shape are stacked, it is possible to reliably stack the heat sinks by preventing the heat sinks from being inclined with respect to each other due to the projections from the holding holes and smoothly supply the individual heat sinks to the production line in the step of assembling the AC power generator, whereby productivity thereof is improved.

While the content of this invention has been described specifically heretofore with reference to the preferred embodiments, it is obvious to those skilled in the art that this invention can take various modified forms on the basis of the basic technical idea and teaching of this invention.

For example, in each of the embodiments described above, the number of poles in the rotor is assumed to be 12 and the number of slots in the stator iron core is assumed to be 72, but the number of poles and the number of slots are not limited thereto. Also, each of the embodiments described above has described the case where the number of slots per pole per phase is 2, but the number of slots per pole per phase is not limited to 2.

Also, in each of the embodiments described above, the positive-side heat sink is assumed to be the first heat sink and the negative-side heat sink is assumed to be the second heat sink. However, it may also be possible that the positive-side heat sink is the second heat sink and the negative-side heat sink is the first heat sink. Also, the gravity center adjustment portions shown in Embodiment 1 are applied to the negative-side heat sink, while the gravity center adjustment portions shown in Embodiment 2 are applied to the positive-side heat sink. However, it will be appreciated that this invention is not limited thereto and the gravity center adjustment portions may be applied to each of the negative- and positive-side heat sinks.

REFERENCE SIGNS LIST

1 Vehicular AC power generator
4 Casing
8 Rotor
12 Stator
18 Voltage adjuster
20, 220 Rectifying device
22 Positive-side heat sink (heat sink)
23 Holes
24 Positive-side rectifying elements (rectifying elements)
26 Negative-side heat sink (heat sink)
27 Holes
28 Negative-side rectifying elements (rectifying elements)
29, 229 Gravity center adjustment portions
30 Circuit board
34, 35 Engaging projections
221 Positive-side fin (fin)
261, 262 Negative-side fins (fins)

The invention claimed is:

1. An AC power generator, comprising:
a rotor rotatably supported in a casing;
a stator having a stator winding wire and supported on the casing;
a rectifying device disposed outside one end of the casing in an axial direction to rectify an AC current generated in the stator winding wire; and
a voltage adjuster disposed outside the one end of the casing in the axial direction to adjust a magnitude of an AC voltage generated in the stator,
the rectifying device including a broken-ring-shaped heat sink supporting a rectifying element and cooling the rectifying element and a circuit board holding the heat sink,
the circuit board including an engaging projection, and
the heat sink including a hole, into which the engaging projection is fit, and a gravity center adjustment portion,
the heat sink further including a step portion surrounding the hole,
wherein the gravity center adjustment portion has the same thickness as the thickness of the step portion surrounding the hole of the heat sink, and
wherein the gravity center adjustment portion is at position different from the step portion surrounding the hole of the heat sink.

2. The AC power generator of claim 1, wherein the gravity center adjustment portion is provided to be stacked above a fin provided on the heat sink.

3. The AC power generator of claim 2, wherein the gravity center adjustment portion projects toward the circuit board from an end of the fin.

* * * * *